(12) United States Patent
Lang

(10) Patent No.: US 12,123,963 B2
(45) Date of Patent: Oct. 22, 2024

(54) LOCATION SYSTEM FOR DETECTING POSITION AND ORIENTATION OF MOVABLE UNITS

(71) Applicant: Be Spoon, Le Bourget du Lac (FR)

(72) Inventor: Jonathan Stéphane Lang, Chambery (FR)

(73) Assignee: Be Spoon, Le Bourget du Lac (FR)

(*) Notice: Subject to any disclaimer, the term of this patent is extended or adjusted under 35 U.S.C. 154(b) by 204 days.

(21) Appl. No.: 17/617,538

(22) PCT Filed: Jun. 26, 2020

(86) PCT No.: PCT/EP2020/068059
§ 371 (c)(1),
(2) Date: Dec. 8, 2021

(87) PCT Pub. No.: WO2020/260606
PCT Pub. Date: Dec. 30, 2020

(65) Prior Publication Data
US 2022/0244342 A1    Aug. 4, 2022

(30) Foreign Application Priority Data
Jun. 28, 2019    (EP) .................................... 19305869

(51) Int. Cl.
*G01S 5/14* (2006.01)
*G01S 5/02* (2010.01)
(Continued)

(52) U.S. Cl.
CPC .............. *G01S 5/0221* (2013.01); *G01S 5/14* (2013.01); *G01S 13/0209* (2013.01);
(Continued)

(58) Field of Classification Search
CPC ........ H04B 1/7163; H04B 2201/71634; G01S 5/0221; G01S 5/14; G01S 13/0209;
(Continued)

(56) References Cited

U.S. PATENT DOCUMENTS 7,479,884 B1    1/2009 Fullerton
7,492,316 B1    2/2009 Ameti et al.
(Continued)

FOREIGN PATENT DOCUMENTS

| CN | 1473310 A | 2/2004 |
|---|---|---|
| CN | 101335587 A | 12/2008 |

(Continued)

OTHER PUBLICATIONS

Zhong, Yao et al., "ZigBee Wireless Sensor Network and its Applications in Internet of Things," Harbin Institute of Technology Press, ISBN 978-7-560-36842-9, Chinese only, Sep. 22, 2018 17 pages.

*Primary Examiner* — Hirdepal Singh
(74) *Attorney, Agent, or Firm* — Slater Matsil, LLP

(57) ABSTRACT

A location system includes transmission reception devices. A first transmission reception device is configured to operate as a stationary unit of the location system for localizing tag devices by exchanging ultra-wideband signals. The tag devices is localizable within a localizing space that extends along a high-resolution line associated with the first transmission reception device. The system also includes a movable unit and first and second tag devices that are positioned at the movable unit and are separated from each other by a tag separation distance. A control system is configured to perform an ultra-wideband signal analysis to determine the distance from a selected tag device to the first transmission reception device and to derive an orientation of the movable
(Continued)

unit with respect to the high-resolution line from distances determined for the first tag device and the second tag device.

34 Claims, 5 Drawing Sheets

(51) Int. Cl.
  *G01S 13/02* (2006.01)
  *G01S 13/08* (2006.01)
  *G01S 13/76* (2006.01)
  *H04B 1/7163* (2011.01)

(52) U.S. Cl.
  CPC ............ *G01S 13/08* (2013.01); *G01S 13/767* (2013.01); *H04B 1/7163* (2013.01); *H04B 2201/71634* (2013.01)

(58) Field of Classification Search
  CPC ........ G01S 13/08; G01S 13/767; G01S 13/74; G01S 5/02
  USPC ...................................................... 455/456.1
  See application file for complete search history.

(56) References Cited

U.S. PATENT DOCUMENTS

| | | | |
|---|---|---|---|
| 10,064,012 B1 | 8/2018 | Boston et al. | |
| 11,201,981 B1 | 12/2021 | Suiter et al. | |
| 11,411,599 B2 | 8/2022 | Subraveti et al. | |
| 11,852,713 B1 | 12/2023 | Bloechl | |
| 2010/0277284 A1 | 11/2010 | Brown et al. | |
| 2011/0170523 A1 | 7/2011 | Chen | |
| 2014/0111313 A1 | 4/2014 | Wild et al. | |
| 2014/0266907 A1 | 9/2014 | Taylor, Jr. et al. | |
| 2015/0356332 A1 | 12/2015 | Turner et al. | |
| 2016/0100289 A1 | 4/2016 | Mayorchik et al. | |
| 2016/0231426 A1 | 8/2016 | Smith et al. | |
| 2017/0003374 A1 | 1/2017 | Hehn et al. | |
| 2017/0128814 A1 | 5/2017 | Ianni et al. | |
| 2017/0131383 A1 | 5/2017 | Bartov et al. | |
| 2017/0135063 A1 | 5/2017 | Bartov et al. | |
| 2017/0270323 A1* | 9/2017 | Butler | G06K 19/07749 |
| 2018/0088186 A1 | 3/2018 | Bhattacharyya | |
| 2019/0043328 A1* | 2/2019 | Thomas | G08B 13/2402 |
| 2019/0244309 A1 | 8/2019 | Ottnad et al. | |
| 2020/0154246 A1 | 5/2020 | Ganz et al. | |
| 2020/0201295 A1 | 6/2020 | Ottnad et al. | |
| 2020/0201303 A1 | 6/2020 | Kiefer et al. | |
| 2020/0208989 A1 | 7/2020 | Ottnad et al. | |
| 2020/0218235 A1 | 7/2020 | Kiefer et al. | |
| 2020/0319289 A1* | 10/2020 | Borsos | G01S 5/06 |
| 2021/0199748 A1* | 7/2021 | Hewett | H04B 1/0007 |
| 2022/0113372 A1* | 4/2022 | Derbez | G01S 13/74 |
| 2022/0210607 A1 | 6/2022 | Bollard | |
| 2022/0276670 A1 | 9/2022 | Fabre | |
| 2023/0063193 A1 | 3/2023 | Wahl | |

FOREIGN PATENT DOCUMENTS

| | | | |
|---|---|---|---|
| CN | 103097905 A | | 5/2013 |
| CN | 105682221 A | | 6/2016 |
| CN | 106211310 A | | 12/2016 |
| CN | 106526616 A | | 3/2017 |
| CN | 107607974 A | | 1/2018 |
| CN | 107765217 A | | 3/2018 |
| CN | 109282811 A | | 1/2019 |
| DE | 102017120381 A1 | | 3/2019 |
| JP | 2014065568 A | * | 4/2014 |
| KR | 20120008705 A | | 2/2012 |
| WO | 2014013667 A1 | | 1/2014 |
| WO | 2015187991 A1 | | 12/2015 |
| WO | 2016140792 A1 | | 9/2016 |
| WO | 2017196583 A2 | | 11/2017 |
| WO | 2018073421 A2 | | 4/2018 |
| WO | 2018073422 A2 | | 4/2018 |
| WO | 2019048149 A1 | | 3/2019 |
| WO | 2019048151 A1 | | 3/2019 |
| WO | 2019048152 A1 | | 3/2019 |
| WO | 2019048153 A1 | | 3/2019 |
| WO | 2019052742 A1 | | 3/2019 |
| WO | 2019068175 A1 | | 4/2019 |
| WO | 2020212722 A1 | | 10/2020 |

* cited by examiner

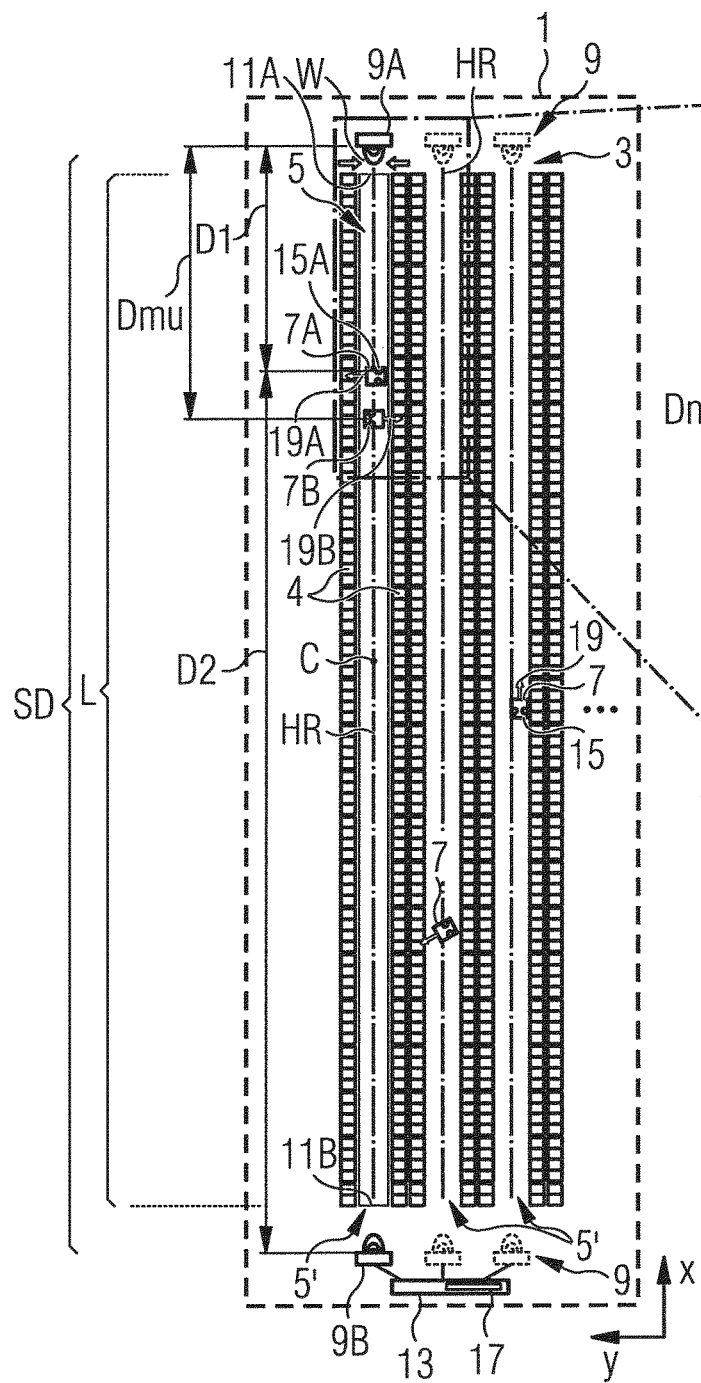
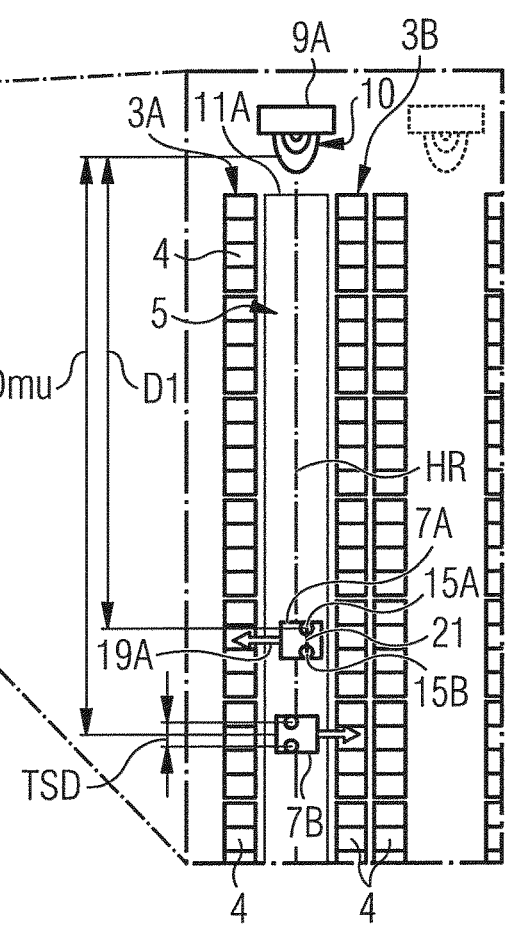
FIG 1A
FIG 1B

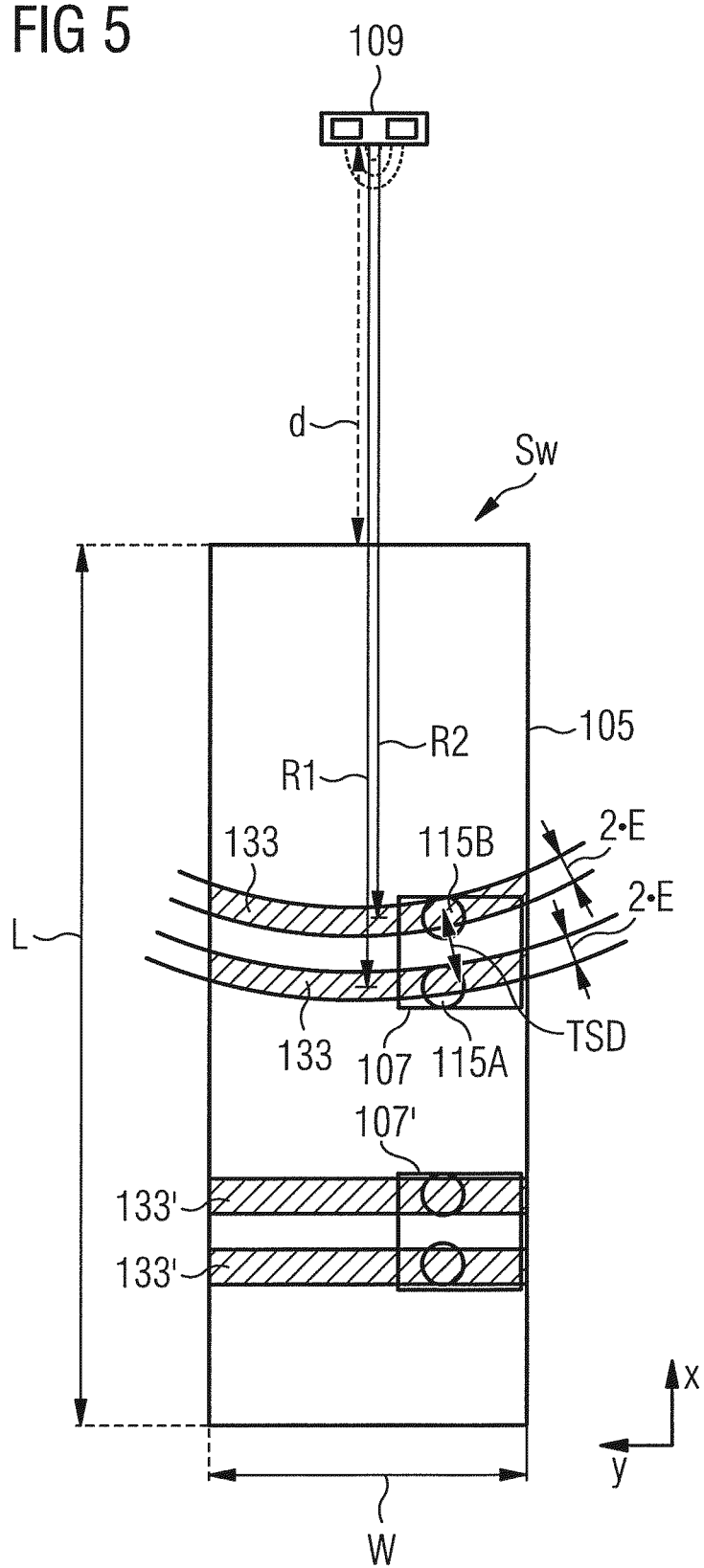

LOCATION SYSTEM FOR DETECTING POSITION AND ORIENTATION OF MOVABLE UNITS

CROSS-REFERENCE TO RELATED APPLICATIONS

This application is a national stage application of International Application No. PCT/EP2020/068059, filed on Jun. 26, 2020, which claims priority to European Patent Application No. 19305869.0, filed on Jun. 28, 2019, which applications are hereby incorporated herein by reference.

TECHNICAL FIELD

The present disclosure relates generally to (indoor) location systems.

BACKGROUND

Indoor location systems are usually based on stationary units (herein also referred to as stationary transmission reception devices) and mobile units (herein also referred to as tags or tag devices). While the position of a stationary unit is known to the location system as a preset fixed (reference) position, mobile units are usually attached to movable units, and thus mobile, and can be moved or move, thereby changing their position within a localizing space. The location system is configured to determine the location of the mobile units. When a mobile unit is physically connected to a certain piece or being, the same may be localized via the mobile unit.

One possible technology for localization, especially for indoor localization is the ultra-wideband (UWB) technology. UWB technology in the meaning of this application should be understood as a radio technology for signal exchange operating with a center frequency over 1 GHz with a bandwidth not less than 200 MHz.

For example, US 2016/0100289 A1 discloses a localization and tracking system for determining the positions of mobile wireless devices using inter alia an ultra-wideband (UWB) technology. US 2015/0356332 A1 discloses, for example, motion sensors based on UWB technology for performance analysis in sports.

UWB location systems use UWB signals to measure the distance between components of the UWB location systems, specifically between the mobile units and stationary units. Knowing distances of a mobile unit to a plurality of stationary units enables a determination of the position of the mobile unit in two-dimensional (2D) or three-dimensional (3D) spaces. Precise timings of the emission and reception of the UWB signals are required to allow measurements such as time-of-flight measurements (also referred to as time-of-arrival measurements) or time-difference-of-arrival measurements with a required accuracy. UWB-based location systems can obtain a position of a mobile unit, for example, by calculating differences in arrival times of signals communicated between several stationary units and a mobile unit.

A UWB location system may be based on a location rate frame format defining temporally the respective activities performed usually for one cycle of the location measurement. Exemplary UWB location systems are described, for example, in the PCT-application formerly PCT/FR2019/000057, now PCT/IB2019/000745 "ULTRA-WIDEBAND LOCATION SYSTEMS AND METHODS" with the filing date of 19 Apr. 2019 by the same applicant, the entire contents of which is incorporated herein by reference. The U.S. national stage application has been assigned application Ser. No. 17/604,914.

Generally, a desired resolution of the localization may be needed to monitor an activity that is associated to a specific position of a mobile unit within the localizing space. Generally, the accuracy of the localization increases with the number of stationary units. That means on the other hand that, for a reduced number of stationary units, the accuracy of the localization will also be reduced. In particular for small numbers of stationary units such as for two stationary units, the relative positions of the stationary units and the mobile unit also affect the accuracy. The latter relates to the known effect of dilution of precision and in particular affects systems with a reduced number of stationary units.

Moreover, the complexity and costs of installing location systems increase with the number of stationary units. Thus, operating the location system with a reduced number of stationary units is preferred.

Thus, the present disclosure is directed, at least in part, to improving or overcoming one or more aspects of prior systems; in particular, the present disclosure addresses the installation of stationary units for specifically shaped localizing spaces, within which also the orientation of movable units is of interest.

SUMMARY

The present disclosure relates generally to (indoor) location systems. Moreover, the present disclosure relates generally to a location system based on an ultra-wideband signal exchange, and specifically location systems that allow identifying an orientation of a movable unit within a localizing space of such a location system.

In a first aspect, the present disclosure is directed to a location system based on an ultra-wideband signal exchange. The location system includes a plurality of transmission reception devices, wherein a first transmission reception device of the plurality of transmission reception devices is configured to operate as a stationary unit of the location system for localizing tag devices by exchanging ultra-wideband signals. The tag devices are localizable within a localizing space that extends along a high-resolution line that is associated with the first transmission reception device. The location system includes further a movable unit with a first tag device and a second tag device. The first tag device and the second tag device are positioned at the movable unit separated from each other by a tag separation distance. The location system includes further a distance determination unit configured to perform an ultra-wideband signal analysis to determine, for a selected tag device within the localizing space, the distance from the selected tag device to the first transmission reception device. The distance determination unit is further configured to derive an orientation of the movable unit with respect to the high-resolution line from the distances determined for the first tag device and the second tag device.

In another aspect, a movable unit is disclosed for improved identification of an orientation of the movable unit with respect to an elongated localizing space. The movable unit includes a first tag device and a second tag device, each tag device being a component of a location system that is configured (as described herein and in particular above) for identifying an orientation of the movable unit with respect to a high-resolution line based on a determined sequence of the first tag device and the second tag device with respect to the high-resolution line, wherein the tag devices are separated from each other by a tag separation distance selected/set to allow identification of which of the first tag device and the second tag device is closer to a transmission reception device of the location system.

In another aspect, a storage system includes a storage hall with a plurality of linearly extending rows of shelves, at least one access space between respective two of the rows of shelves for allowing access to storage areas of the shelves at each side of the access space; a location system (as described herein and in particular above), wherein a localizing space of the location system essentially overlaps with the access space. The localizing space is elongated along a high-resolution line of the location system. The localizing space extends, for example, optionally in-between a first transmission reception device and a second transmission reception device of the location system, wherein the first transmission reception device and the second transmission reception device are positioned at opposite ends of the rows of shelves. The storage system includes further a storing and/or picking device (such as a movable unit of the location system) that is equipped with the first tag device and the second tag device of the location system, the first tag device and the second tag device being mounted at sides of the storing and/or picking device. A direction of interest of the storing and/or picking device is related to a storing and/or picking activity performed with the storing and/or picking device. Alternatively or in addition, the storage system includes a worker carrying or wearing a movable unit of the location system that is equipped with the first tag device and the second tag device of the location system, wherein the first tag device and the second tag device are positioned at sides of the worker. A direction of interest associated with worker is related to a storing and/or picking activity performed by the worker. Furthermore, a distance determination unit of the location system is configured to analyze which shelf at which side of the access space was accessed using an analysis of an orientation of the direction of interest with respect to the high-resolution line.

In another aspect, a method is disclosed for identifying an orientation of a movable unit within a localizing space of a location system, in particular an ultra-wideband location system. The location system thereby includes a first tag device and a second tag device, attached to the movable unit at a tag separation distance, and a first transmission reception device configured to operate as a stationary unit of the location system for localizing tag devices by exchanging ultra-wideband signals. The tag devices are localizable within a localizing space that extends along a high-resolution line associated with the first transmission reception device. The method includes the steps of determining the distances from each of the first tag device and the second tag device to the first transmission reception device; deriving from the distances determined for the first tag device and the second tag device the orientation of the movable unit with respect to the high-resolution line.

Further embodiments of the above aspects, are disclosed in the dependent claims, which are incorporated herein by reference.

For example, in some embodiments, the distance determination unit is configured to determine, for a selected tag device in the localizing space, the distance from the selected tag device to the first transmission reception device with an uncertainty of the distance given by a distance resolution of the ultra-wideband signal analysis, and the tag separation distance is at least as large as the distance resolution of the location system, such as at least once, twice or three times the distance resolution of the location system. In addition or alternatively, the tag separation distance is at the most 50 times, such as less than 30 or 10 times, the distance resolution of the location system.

In some embodiments, the distance determination unit may be further configured to derive the orientation of the movable unit with respect to the high-resolution line by identifying a sequence of the first tag device and the second tag device along the high-resolution line, when projecting the determined distances onto the high-resolution line.

In some embodiments, the movable unit may be associated with a direction of interest that extends under a pre-defined angle to a tag-connection line extending between the tag devices, and the distance determination unit may be further configured to derive the orientation as an orientation of the direction of interest with respect to the high-resolution line.

In some embodiments, the location system may further include a second transmission reception device. Then, the localizing space may extend in-between the first transmission reception device and the second transmission reception device along the high-resolution line. Moreover, the distance determination unit can then be configured to derive, for a selected tag device in the localizing space, from determined distances of the selected tag device to the first transmission reception device and the second transmission reception device, a range of (potential) positions within the localizing space having a high-resolution extent in a direction along the high-resolution line and a low-resolution extent in a direction orthogonal to the high-resolution line. The high-resolution extent is smaller than the low-resolution extent, and the tag separation distance is larger than the high-resolution extent. In further developments, the localizing space may extend elongated between the first transmission reception device and the second transmission reception device. The localizing space may have a first end at the first transmission reception device, a second end at the second transmission reception device, and a center centrally between the first end and the second end, wherein the first transmission reception device, the center of the elongated localizing space, and the second transmission reception device are aligned to an extent that the center of the elongated localizing space is shifted with respect to the high-resolution line by less than 3-times, such as less than twice or even 50%, the width of the elongated localizing space.

In some embodiments of the location system, the movable unit can be a vehicle, an unmanned vehicle, or a unit carried by a human being such as an article of worker clothing.

In some embodiments, the localizing space can be elongated along the high-resolution line and/or it can be delimited by structures such as shelves. It may form an access space accessible for the movable unit. Optionally, the transmission reception devices may be positioned at opposite ends of the elongated localizing space. Alternatively or in addition, the localizing space may have a length L in a direction of the high-resolution line and a width W orthogonal to the high-resolution line and the length L is at least 3-times such as at least 5-times the width W. Optionally, the length L may be at least 20 m, such as at least 30 m. The width W may be 6 m or less.

In some embodiments of the location system, at least one of the plurality of the transmission reception devices and/or the tag devices can include a circuit board electronics with a radio pulse wave generator and receiver configured to perform ultra-wideband radio transmission and reception for large bandwidth communication with a bandwidth of at least 500 MHz or of at least 20% of a carrier frequency, in particular in a frequency band of 3.1 GHz to 10.6 GHz such as at 4 GHz or 8 GHz with an equivalent isotropically radiated power density of less than or equal to 41.3 dBm/MHz.

In some embodiments of the location system, the first tag device and the second tag device share common circuit board electronics and each have a respective antenna, the positions of which define the positions of the respective tags. The antenna of the first tag device and the antenna of the second tag device are separated from each other by the tag separation distance, and the distance determination unit may alternatively or further be configured to derive the orientation of the movable unit (with respect to the high-resolution line from the distances determined for the first antenna of the first tag device and for the second antenna of the second tag device.

In some embodiments of the movable unit described in the above aspects, the first tag device and the second tag device may share common circuit board electronics and may each have a respective antenna that defines the position of the respective tag. The antenna of the first tag device and the antenna of the second tag device then are separated from each other by the tag separation distance.

In some embodiments of the distances from the tag devices to the first transmission reception device are determined with an uncertainty of the distance given by a distance resolution of the ultra-wideband signal analysis, that is less than or equal to the tag separation distance.

In some embodiments of the step of deriving the orientation, the step may further include projecting the determined distances onto the high-resolution line; identifying a sequence of the first tag device and the second tag device along the high-resolution line; and deriving the orientation of the movable unit with respect to the high-resolution line based on the determined sequence.

In some embodiments of the step of deriving the orientation, the step may further include associating the identified sequence with orientation classes including two orientation classes specified as two directions being orthogonal to the high-resolution line and pointing in opposite directions, and optionally one orientation class specified as a direction along the high-resolution line.

In some embodiments of the method, the (applied) location system includes the first transmission reception device and a second transmission reception device and the localizing space extends in-between the first transmission reception device and the second transmission reception device along the high-resolution line, which connects the first transmission reception device and the second transmission reception device. Then the method may further include determining the distances from each of the first tag device and the second tag device to the second transmission reception device and deriving from the determined distances a range of positions within the localizing space having a high-resolution extent in a direction along the high-resolution line and a low-resolution extent in a direction orthogonal to the high-resolution line. The high-resolution extent is smaller than the low-resolution extent, wherein the tag separation distance is larger than the high-resolution extent.

In some embodiments, the method further includes the steps of associating a direction of interest to the movable unit, the direction of interest extending under a predetermined angle with respect to a tag-connection line between the first tag device and the second tag device, in particular wherein the predetermined angle is an angle in the range between 50° and 130° with respect to the tag-connection line such as about 90° with respect to the tag-connection line resulting in the direction of interest and the tag-connection line running orthogonal to each other; and deriving the orientation as an orientation of the direction of interest with respect to the high-resolution line.

In some embodiments, the method further includes the steps of: limiting a movement range of the movable unit to an elongated access area corresponding to the localizing space, defining an elongated access area for the movable device corresponding to the localizing space, and/or associating the distance measured for one of the tag devices or an averaged mean distance of the tag devices to a position of the tag device within the localizing space along the high-resolution line.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 1A is a schematic view of a storage hall with several elongated localizing spaces that are subject to a location system;

FIG. 1B shows a section of the storage hall shown in FIG. 1A;

FIG. 5 is a schematic illustration of a localization procedure of a movable unit with a single stationary device.

DETAILED DESCRIPTION OF ILLUSTRATIVE EMBODIMENTS

Figure 2:
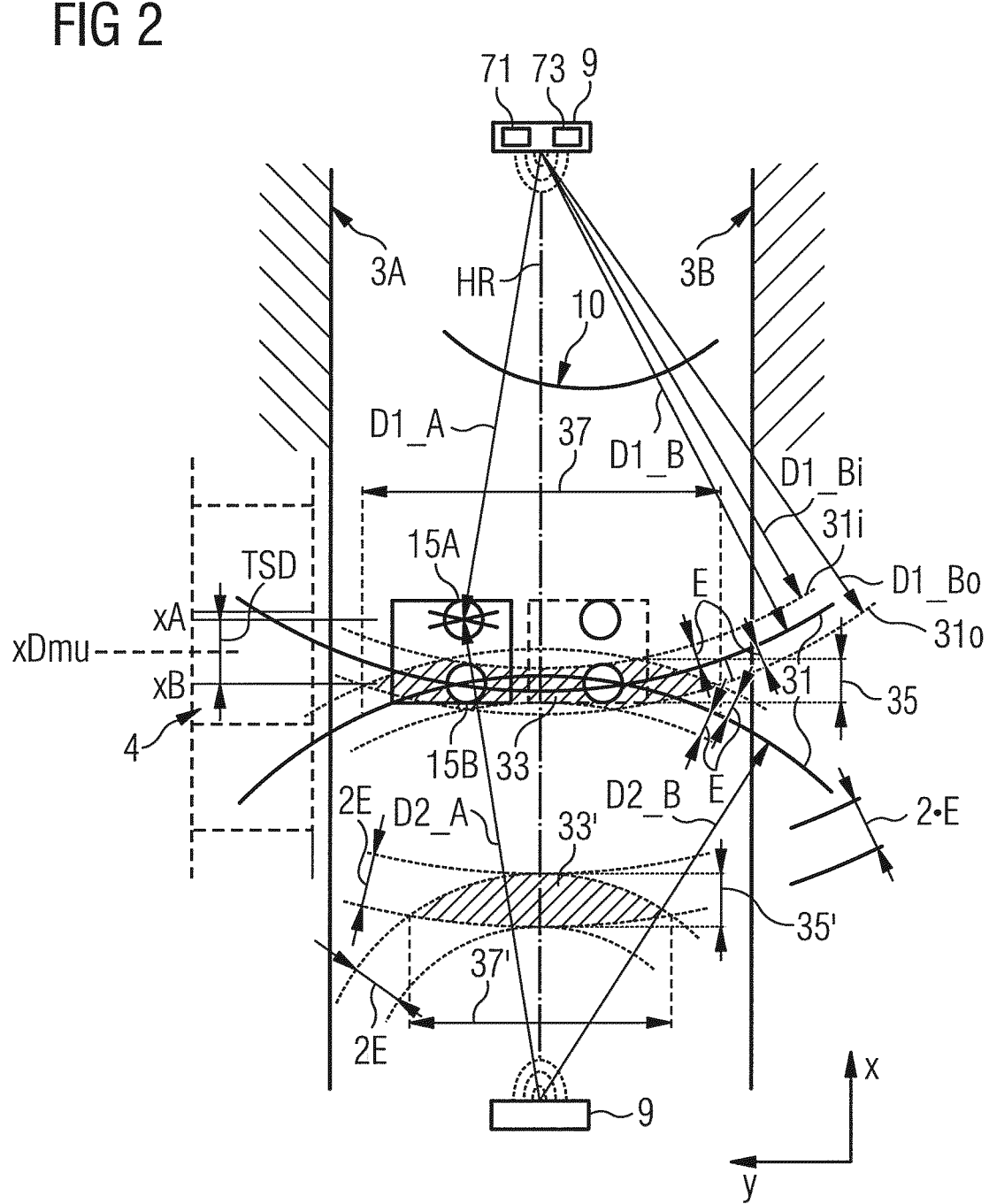
FIG. 2 is a schematic illustration of a localization procedure of a movable unit with two stationary devices for illustrating a dilution of precision.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The disclosure is based in part on the realization that in layouts of halls, such as in warehouses or storage halls, a plurality of elongated localizing spaces may be subject to localizing procedures. As elongated localizing spaces may extend over large distances, reducing the dilution of precision would require a large number of stationary units positioned along the elongation of the localizing space. For example, for an aisle between two rows of shelves, the number of stationary units would need to ensure acquisition of a location with a high precision that allows associating a storing/picking activity that is monitored with a tag device to the respective side (here row of shelves). In other words, to derive the information on which side of an aisle a storing/picking activity was performed, a resolution provided by a conventional location system may be needed that allows detecting on which side of the aisle an activity took place. Generally, the precision of localization of a tag device may need to be adapted to the environment of the detected location.

The inventors realized that a large number of stationary units may be avoidable if the location system includes/positions one stationary unit at one end or two stationary units at opposite ends of an elongated localizing space and there are provided two tag devices at a (each) movable unit that performs an activity that needs to be monitored. Then, one can detect the location of the movable unit, e.g., via localizing one or both of the two tag devices in one direction herein that is referred herein as a high-resolution line. The high-resolution line may extend, for example, along the aisle. For the case of using one stationary unit, the high-resolution line would be a radial direction overlapping with the localizing space. For the case of two stationary units, the high resolution line would be a line connecting the two stationary units and extending preferably at least partly through the localizing space.

If the resolution provided by the one or two stationary units along the high-resolution line is sufficient to distinguish between the tag devices, one can—in addition to the position of the movable unit—detect an orientation of the movable unit carrying the tag devices. Thus, using two tag devices can overcome the need of a high-resolution localization in two dimensions.

In this context, the detection of an orientation should at least allow distinguishing orientations for specific types of activities such as addressing the one or the other row of shelves. For example, an orientation can be computed with respect to the high-resolution line: e.g.: in which direction away from the high-resolution line the movable unit is "pointing"/oriented to perform an activity.

Specifically, it is proposed to derive the orientation using the two tag devices that are arranged specifically with respect to the type of activity on the movable unit. The arrangement and in particular a distance between the tag devices (herein referred to as tag separation distance) allow individual localization of each tag device at least if aligned along the high-resolution line.

For example, if a direction of interest can be associated to the movable unit, a tag device may be positioned at each side with respect to the direction of interest. A distance between the two tag devices, i.e., the tag separation distance, has a specifically selected size. The size is selected to allow the individual localization of each of the tag devices along the high-resolution line at least for those orientation states that need to be identified. In other words, the tag separation distance and the resolution along the high-resolution line should allow distinguishing between the tag devices in 2D or 3D space when performing the activity.

Thus, the herein proposed concept can overcome, for example, the requirement of high resolution localization in two dimensions when monitoring an activity within an elongated localizing space.

In the following, embodiments of a location system are disclosed in connection with FIGS. 1A to 6B that combine localization in one dimension with orientation detection.

FIG. 1A schematically illustrates a storage hall 1. Within the storage hall 1, several rows 3 of shelves delimit a sequence of elongated access spaces 5'. Within the access spaces 5', elongated localizing spaces 5 are defined within which a localization procedure is to be performed with a location system. Generally, for the herein disclosed concepts, a localizing space may be delimited by structures such as shelves (including for example, some protective zone before the shelves. The localizing space 5 (as the access space 5') is accessible for a unit to be localized. Specifically, within the localizing space 5, the position and orientation of movable units 7, 7A, 7B need to be detected in order to be able to record, for example, loading/picking activities performed at a specific storage area 4 (e.g., a shelf-section) of a specific row 3. In FIG. 1A, the two movable units 7 move along neighboring aisles to approach selected shelf-sections. Once they reached their assigned shelf-sections, the orientation of the movable units 7 becomes relevant to know at which side of the access space the activity was performed, as illustrated with movable units 7A and 7B.

FIG. 1B shows enlarged the two loading/picking activities performed by the movable units 7A, 7B at a row 3A and a row 3B extending at opposite sides of the aisle.

As shown in FIG. 1A, the location system includes a plurality of transmission and reception devices 9, 9A, 9B. In the exemplary embodiment of FIG. 1A, the transmission and reception devices 9 are pairwise positioned at each end of one of the access spaces 5'. In other words, the localizing spaces 5 extend between respective pairs of the transmission and reception devices 9, 9A, 9B. For each aisle extending between respective rows of shelves, transmission and reception devices are located at the ends (short sides of the localizing areas). For example, for the aisle in which movable units 7A and 7B perform activities, the transmission and reception devices 9A and 9B are positioned at a first end 11A and a second end 11B of the localizing space 5. The transmission and reception devices 9A and 9B are separated by a separation distance SD.

FIG. 1A further indicates a width W and a length L of the localizing space 5 associated to the access space 5'. In FIG. 1A, the width W extends along the Y-direction, while the length L extends along the X-direction. Within the localizing space 5, the localization should be performed with a preset resolution as discussed in connection with FIG. 2. Furthermore, a center point C is indicated for the localizing space 5. In the example of FIG. 1A, the center point C is located on a high-resolution line HR connecting the transmission and reception device 9A and the transmission and reception device 9B.

For example, the length L is defined in a direction of the high-resolution line HR and the width W is defined orthogonal to the high-resolution line HR. The length L may be at least 3-times the width W; for example, the length L may be at least 5-times the width W. In some embodiments, the length L is at least 20 m, such as at least 30 m, and the width W is about 6 m or less such as about 4 m or 2 m. The ratio width W to length L may be in the range from ⅓ to 1/10 or even less.

Generally, the first transmission reception devices and the center C of the elongated localizing space 5 do not need to be aligned. In some embodiments, the center C of the elongated localizing space 5 may be shifted with respect to the high-resolution line HR. The shift may be less than 3-times the width W of the elongated localizing space 5. For example, the center C of the elongated localizing space 5 may have a distance of 2 W or 0.5 W from the high-resolution line HR. The shift and/or the direction of the high-resolution line with respect to the center C is selected for allowing proper distance measurements within the localizing area 5.

In view of only two transmission and reception devices 9A, 9B being used for the localization within the localizing space 5, the precision along the high-resolution line HR (i.e., in the direction of the length L of the access space 5) is significantly increased in comparison to the precision provided orthogonally to the high-resolution line HR (i.e., in the direction of the width W of the localizing space 5). This is referred to as dilution of precision and is further explained in connection with FIG. 2.

The location system may be based on the exchange of UWB-signals 10 between transmission and reception devices and tag devices located within the respective localizing space 5; see, for example, the above mentioned PCT application PCT/FR2019/000057 for an exemplary UWB implementation. To process information about UWB-signals 10 received by the transmission and reception devices, e.g., from the tag devices 15, the location system includes a distance determination unit 13 that is configured to derive distance information for a respective tag device with respect to the transmission and reception devices. In FIG. 1A, the distance determination unit 13 is shown as a separate unit within the storage hall 1. Generally, the distance determination unit 13 can be part of a control system of the location system or of the control systems of the movable units.

For a tag device 15A of the movable unit 7A, FIGS. 1A and 1B show a distance D1 with respect to the transmission and reception device 9A at the first end nA. For completeness, a distance D2 is similarly shown in FIG. 1A for the tag device 15A with respect to the transmission and reception device 9B at the second end 11B. Assuming that the position of the tag device 15A is known with respect to the movable unit 7A, one knows the position of the movable unit 7A along the high-resolution line HR as soon as one or both of the distances between the transmission reception devices to the tag devices are given. Exemplarily, a respective distance Dmu is indicated for a movable unit 7B and a transmission reception device 9A in FIGS. 1A and 1B, whereby the distance Dmu is associated to a center position between the tag devices.

In addition to knowing the position (distance from an aisle end) along the high-resolution line HR, also the orientation of the movable units can be used to identify and record the "correct" storage area 4 that is addressed by a storing and/or picking activity of a movable unit.

In contrast to providing a very high resolution not only along the high-resolution line HR, but also across the same (requiring as initially said a larger number of stationary devices along the high-resolution line HR for 2D-localization), the herein proposed concept uses two tag devices mounted at each movable unit 7, 7A, 7B.

As will be explained in connection with FIG. 4, based on the distances determined by the distance determination unit 11 for those two tag devices 15A, 15B, an orientation analysis unit 17 within the distance determination unit 13 can derive orientation information about the movable units 7. As for the distance determination unit 13, the orientation analysis unit 17 can be part of a control system of the location system or of the control systems of the movable units.

Generally, an activity to be monitored with the location system may be associated with a direction of interest. In FIGS. 1A and 1B, directions of interest 19, 19A, 19B are associated with each of the movable units 7, 7A, 7B and are shown as arrows. For example, the directions of interest 19, 19A, 19B indicate in what direction the movable units can interact with the shelves. In a storage application, a direction of interest may be associated with a storing and/or picking activity of a movable unit.

For identifying an activity correctly, the orientation of the direction of interest needs to be derived with respect to the rows 3 of shelves if the resolution across the high-resolution line HR is not given. Exemplarily for identifying the direction of interest 19A of the movable unit 7A, the tag devices 15A, 15B are located at each side of the movable unit 7A as illustrated in FIG. 1B. A tag-connection line 21 between the tag devices 15A, 15B extends at a predetermined angle with respect to the direction of interest 19A. Preferably, the angle is in the range from 50° to 130° to allow a clear identification of an orientation with respect to, e.g., the rows 3 of shelves when performing the activity; for example, in FIG. 1B, the tag-connection line 21 extends orthogonally to the direction of interest 19A to avoid the need for additional considerations of geometric boundary conditions during the orientation analysis.

Moreover, a tag separation distance TSD is illustrated for the movable unit 7B in FIG. 1B. The tag separation distance TSD may be at least the distance resolution of the location system, such as at least once, twice or three times the distance resolution of the location system. In some embodiments, the tag separation distance TSD may be at the most 50 times, or such as less than 30 or 10 times, the distance resolution of the location system. The distance resolution of the location system along the high-resolution line HR may be in the range of less than 0.5 m such as about 0.2 m or 0.1 m or even less. Thus, a tag separation distance TSD may be in the range of 1 m or 0.5 m, for example.

FIG. 2 illustrates the concept of determining the position of a tag device within a localizing area spanned between two transmission reception devices. Specifically, a position along an X-axis extending along the rows of shelves is determined by UWB-signal exchange. Exemplarily, transmission and reception devices 9 emit UWB-signals 10 that are received and returned by respective UWB-components within the tag device. The transmission reception devices 9 and the tag devices each may include, for example, a circuit board electronics 71 with a radio pulse wave generator and receiver 73. The radio pulse wave generator and receiver 73 may be configured to perform ultra-wideband radio transmission and reception for large bandwidth communication with a bandwidth of at least 500 MHz or of at least 20% of a carrier frequency. The communication may take place in particular in a frequency band of 3.1 GHz to 10.6 GHz such as at 4 GHz or 8 GHz with an equivalent isotropically radiated power density of less than or equal to 41.3 dBm/MHz.

In an ultra-wideband signal analysis, distances from a selected tag device to each of the first transmission reception device and the second transmission reception device can be determined. This is illustrated in FIG. 2 for the tag device 15A and the tag device 15B by distances D1_A, D2_A and distances D1_B, D2_B, respectively. In addition, for tag device 15B, distance circles 31 are shown. As can be seen, there is an uncertainty of the determined distances that is given by a distance resolution of the ultra-wideband signal analysis used in the location procedure.

To indicate the limited resolution, FIG. 2 shows an (error) range having an extent of 2E for each of the distance circles 31, with E indicating the assumed maximal error in radial direction for the UWB signal analysis.

FIG. 2 further shows two (inner and outer) distance boundary circles 31$i$ and 31$o$ for illustrating the error range for D1_B. For example, the distance boundary circle 31$i$ is an inner circle of radius D1_Bi and the distance boundary circle 31o is an outer circle of radius D1_Bo. The radius D1_Bi and the radius D1_Bo are given as D1_Bi=D1−E and D1_Bo=D1+E, respectively. When measuring the distance value D1_B for the tag device 15B, the tag device 15B can in principle have a distance from the transmission and reception device 9 in the range between D1_B−E up to D1_B+E with D1_B being a center value for the measured distance. In other words, the UWB signal analysis can perform a distance determination in radial direction with a distance resolution of 2E.

From the distances D1_B, D2_B, a position range 33 for the selected tag device 15B can be derived by taking into consideration the overlap of the error ranges associated to the distance D1_B and distance D2_B. The position range 33 is larger in a direction orthogonal to the high-resolution line HR than in a direction along the high-resolution line HR. Schematically, a small X-resolution 35 and a large Y-resolution 37 (due to the dilution of precision) result in the position range 33 extended in Y-direction such that a well-defined "left-right" position with respect to the rows 3A, 3B in Y-direction cannot be derived. As illustrated by another position range 33' that is closer to one of the transmission and reception devices 9, the shape and extent of the position ranges may vary along the high-resolution line HR. Generally, there is implicitly a large uncertainty in the Y-position due to the dilution of position. This is indicated by the second movable unit shown in dashed lines in FIG. 2 for which also the distances D1_A, D2_A, D1_B, D2_B could have been measured.

At the left side of FIG. 2, positions xA and xB separated by the tag separation distance TSD are indicated for the two tag devices 15A, 15B of the movable unit; furthermore, an X-position xDmu of the movable unit with respect to the row 3A of shelves is shown. Generally, the distances D1_A, D2_A, D1_B, D2_B measured for one of the tag devices or an averaged mean distance of the tag devices may be associated to a position of the tag device along the high-resolution line HR. Positions xA and xB can be considered to correspond to projected determined distances onto the high-resolution line.

Those positions can be used to not only determine the position of the movable unit but to also determine its orientation as explained in connection with FIG. 4.

Figure 3:
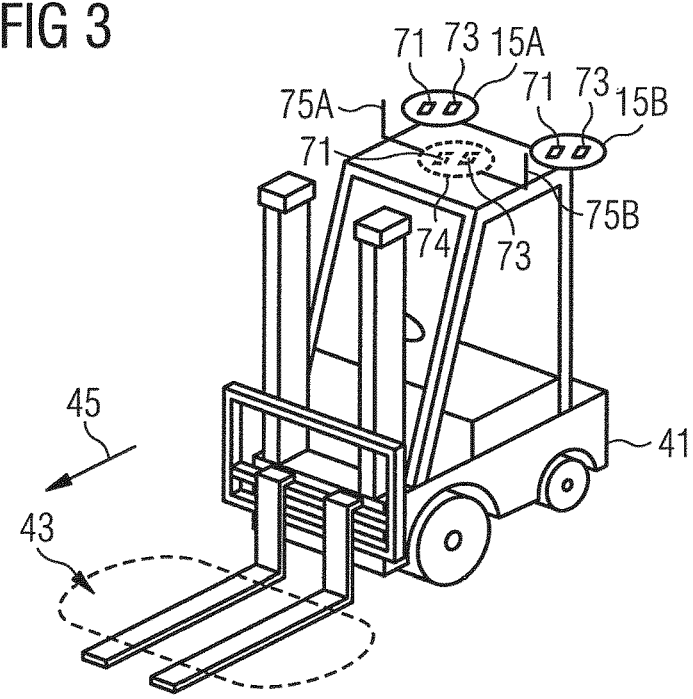
FIG. 3 is a schematic view of a forklift truck as an exemplary movable unit.

FIG. 3 illustrates a forklift truck 41 as an exemplary movable unit having a first tag device 15A and a second tag device 15B both mounted to the roof, for example. The tag devices are separated by the tag separation distance and may each include a circuit board electronics 71 and a radio pulse wave generator and receiver 73. The forklift truck 41 is associated with a direction of interest that extends under a predefined angle to a tag-connection line between the tag devices. In this case, the direction of interest is given by a loading direction 45 associated with a loading area 43 for picking up and transporting parts and the tag connection line runs orthogonal to the loading direction 45.

To detect the orientation of the forklift truck 41 and generally a movable unit, the positions xA and xB in FIG. 2 should be resolvable/distinguishable by the location system. The distance determination unit 13 may be further configured to identify which of the first tag device and the second tag device is closer to one of the transmission reception devices. This allows determining a sequence (order) of the first tag device and the second tag device with respect to a direction along the high-resolution line HR. Based on this sequence, for example, the orientation can be derived.

FIG. 3 illustrates a further embodiment of an arrangement used to derive positions xA and xB separated by a tag separation distance (shown with dashed lines). In the arrangement, the tag devices share, for example, a common circuit board electronics and/or radio pulse wave generator and receiver 73 in a common tag unit 74. However, the tag device is configured to be associated with its own position, e.g., by each having a respective antenna 75A, 75B. The positions of the antenna define the positions of the respective tags, wherein the antenna of the tag device 15A and the antenna of the tag device 15B are separated from each other to ensure the required tag separation distance. The distance determination unit 13 can then derive the orientation of the movable unit (forklift truck 41) with respect to the high-resolution line from the distances determined for the first antenna 75A of the tag device 15A and for the second antenna 75B of the tag device 15B.

Alternative embodiments of movable units include articles of clothing such as jackets or other clothing/wearables, in which the two tag devices are integrated. For example, the tag devices or antennas may be positioned near the shoulders or hands of the person wearing the article of clothing such that also the orientation of the person wearing the "movable unit" may be localized within the localizing area and may be associated with an orientation, e.g., when manually picking a piece from a shelf.

Figure 4:
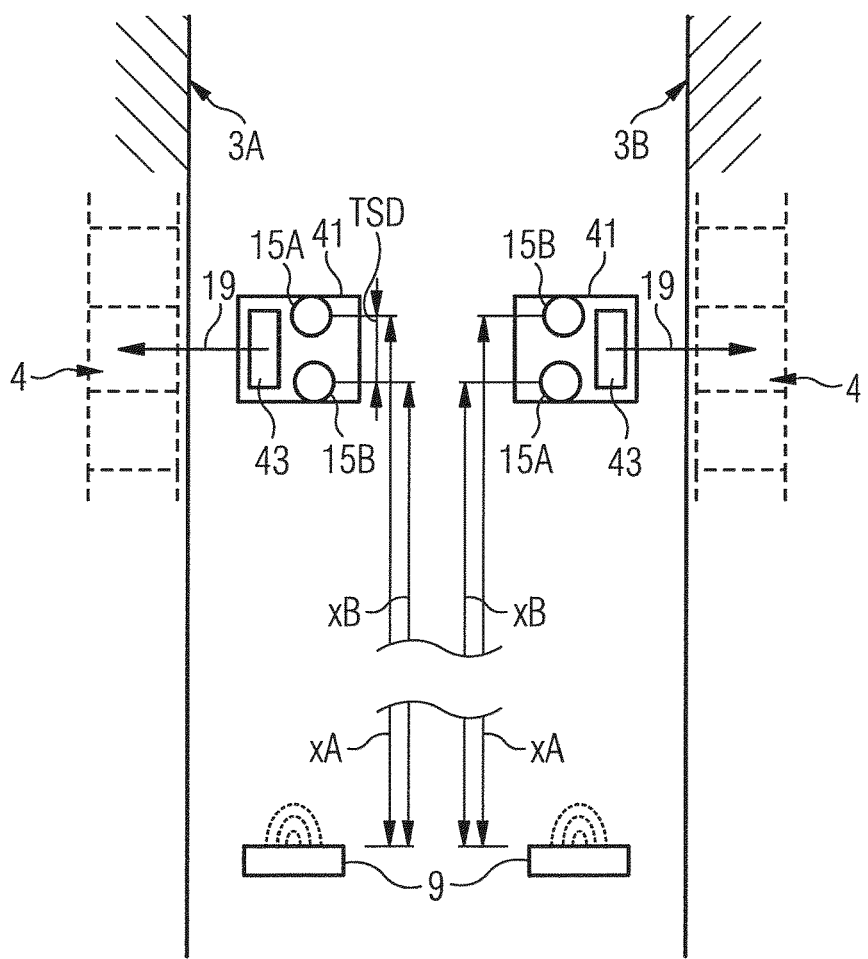
FIG. 4 is a schematic illustration of a storing/picking activity of, e. g., the forklift truck of FIG. 3 involving the detection of the orientation of the forklift truck during the storing/picking activity.

FIG. 4 illustrates two orientations of the forklift truck 41 of FIG. 3, each used to interact with either the row 3A of shelves or the row 3B of shelves at respective storage areas 4.

When interacting with the row 3A of shelves, a distance xA from that transmission reception device 9 to the tag device 15A is larger than a distance xB from the transmission reception device 9 to the tag device 15B. This situation is inverted, when the forklift truck 41 interacts with the row 3B. Distances xA and xB can be considered to correspond to projected determined distances onto the high-resolution line. Based thereon, a sequence of the first tag device and the second tag device along the high-resolution line can be identified. The identified sequence of tag devices with respect to any transmission reception device can be used to identify an orientation of the forklift truck 41.

The distance determination unit 13 may be configured to associate the determined sequence with an orientation of the direction of interest 19 with respect to the high-resolution line HR. Thereby, an orientation of the movable unit is identified with respect to the high-resolution line HR.

FIG. 5 illustrates an embodiment of a location system using a single transmission and reception device 109 for localizing the position of a movable unit 107 and deriving the orientation of the movable unit 107 within an elongated localizing space 105. The movable unit 107 carries a first tag device 115A and a second tag device 115B that are positioned at the movable unit 107 separated from each other by a tag separation distance TSD.

As shown in FIG. 5, the elongated localizing space 105 has a width W (in Y-direction) that is significantly smaller than a length L (in X-direction). The transmission and reception device 109 is positioned at a distance d from a short side Sw of the localizing space 105.

The localizing space 105 may extend between two rows of shelves that the movable unit 107 interacts with, such that orientation detection is required when monitoring an activity, e.g., a pick-up activity, performed with or by the movable unit 107. The movable unit 107 may access the localizing space 105, for example, at the short side Sw and exit the localizing space 105 at the opposite side after having picked up a part from a specific shelf.

The transmission and reception device 109 is exemplarily centered in X-direction with respect to the width W. Generally the transmission and reception device 109 may be positioned such that along the X-direction a high precision measurement of a position of a tag device of the location system can be achieved. The precision should be adapted to the intended activity, e.g., to identify a shelf addressed by an activity of the movable unit 107.

In FIG. 5, distances R1 and R2 (corresponding to the radius value of associated distance circles) are indicated exemplarily for the two tag devices 115A, 115B. Furthermore, FIG. 5 shows a position range 133 that is subject to a distance resolution of 2E in radial direction from the transmission and reception device 109. The position range 133 is limited in Y-direction by the size of the localizing space 105.

As will be understood, for a UWB signal analysis based on a single transmission and reception device 109, the position range 133 is curved due to the point source aspect of the transmission and reception device 109.

The curvature aspect may become negligible for large differences between a tag device and the transmission and reception device 109 as well as for a small width W or a high resolution (small E-values). In FIG. 5, this is schematically indicated with essentially linear position ranges 133' of the measurement performed for a movable unit 107' being "further away" from the transmission and reception unit 109.

The movable unit 107 may allow interaction or be used in connection with an interaction with a shelf in a direction of interest that extends under a predefined angle (in FIG. 5, e.g., 90°) to a tag connection line extending between the tag devices 115A, 115B. Knowing the sequence of tag devices 115A, 115B along the radial direction, allows deriving an orientation of the movable unit 107 with respect to the radial direction (corresponding in this case to the high-resolution line HR shown in FIG. 2, for example).

For the situation shown in FIG. 5, in particular at a sufficiently large distance from the transmission and reception device 109, the orientation of the movable unit 107 can be identified from the distances R1, R2 (determined for the first tag device 115A and the second tag device 115B) as long as, for example, the condition TSD≥2E is fulfilled.

Figure 6A:
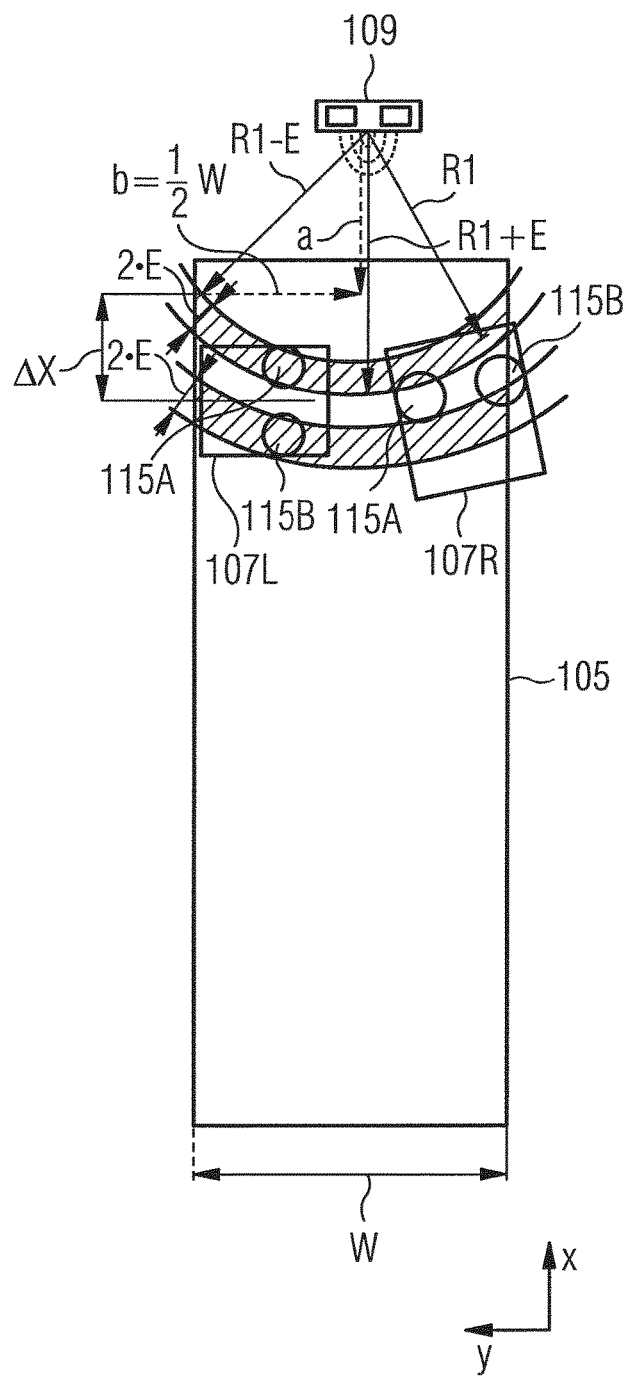
FIG. 6A and FIG. 6B are schematic illustrations further illustrating aspects of the localization procedure with a single stationary device.
Figure 6B:
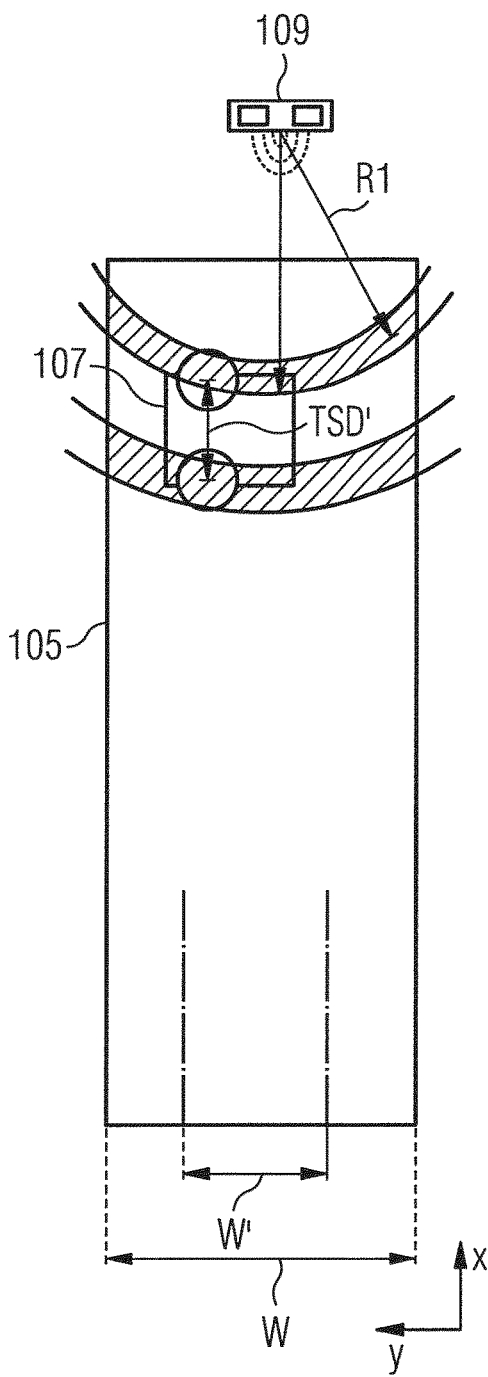

Referring to FIGS. 6A and 6B, when the movable unit with the tag devices gets closer to the (single) transmission reception device, the curve of the circles representing the distances R1, R2 of the tag devices to the transmission reception device 109 may affect the accuracy. This may cause a misreading of the orientation. In some embodiments, those inaccuracies may be filtered by a modified localizing algorithm that, for example, may take into account the past positions of the tag devices.

In further embodiments, additional measures may be implemented to allow the determination of the orientation at those regions closer to the transmission reception device.

The closer the movable unit 107 gets to the transmission and reception device 109, the larger is the effect due to the curvature within the localizing space 105 onto the position range 133. The effect by the curvature within the localizing space 105 adds to the assumed maximal error E that is implicit to the UWB signal analysis. (It is noted that the curvature effect is essentially not given in the embodiment using two transmission and reception devices positioned at opposite ends.)

In FIG. 6A, for example, the primary orientation "acting towards the left" is shown at the left side of the drawings for a movable unit 107L. Here, the primary orientation is associated with a determined sequence of the tag devices in which the distance R1 is determined for the tag device 115A to be smaller than the distance measured for 115B.

As further illustrated in FIG. 6A, positions and orientations of the movable unit 107 may exist within the localizing space 105 that are no longer associated with the primary orientation. For example, there may be positions and orientations of the movable unit that could be associated with an orientation "acting towards the right" as shown exaggeratedly for a movable unit 107R in FIG. 6A.

It is noted that it is generally the relation between the tag separation distance TSD and the curvature that defines a minimum TSD-value.

A simple estimate can be performed using geometrical considerations as shown in FIG. 6A. Thereby, the estimate looks at the curvature across the entire/complete localizing space 105. In other words, one assumes that an extent $\Delta X$ of the circle section within the localizing space 105 in X-direction defines the uncertainty in X-direction. The extent $\Delta X$ includes E and the curved shape of the position range. As the extent $\Delta X$ depends on the curvature, it depends on the distance of the movable unit 107 to the transmission and reception device 109.

One can calculate the extent $\Delta X$ to be: $\Delta X = E + R1 - ((R1-E)^2 - (W/2)^2)^{0.5}$ For small W-values, $\Delta X$ approaches 2E. Similarly, far away from the transmission and reception device 109, $\Delta X$ approaches 2E. However, close to the transmission and reception device 109, there may be a significant deviation.

Accordingly, one may modify the requirement for the tag separation distance TSD to the extent $\Delta X$, e.g., TSD>$\Delta X$.

An enlarged TSD' is shown in FIG. 6B for a movable unit 107, while the error value E is the same range as in FIG. 6A. One will understand that detections of erroneous orientation can thereby be reduced or even avoided.

In addition or alternatively, one may reduce the width of the localizing space 105 as also illustrated by a reduced width W' in FIG. 6B. Also hereby, erroneous orientation detections can be reduced or even avoided.

In a further alternative embodiment of using a single transmission reception device, the transmission and reception device may be moved further away from the short side Sw. This may allow maintaining a tag separation distance TSD≥2E as the TSD-requirement. For example, one may set a distance d (see FIG. 5) equal to or larger than three times the width of the localizing space 105 to ensure proper identification of the orientation even at the end of the localizing space 105 close to the transmission reception device 109.

Associating the determined sequence with an orientation of the direction of interest with respect to the high-resolution line may include projecting the determined sequence onto orientation classes. The orientation classes may include two orientation classes specified as two directions being orthogonal to the high-resolution line HR and pointing in opposite directions. The situations shown in FIG. 4 would relate to those two orientation classes. A third orientation class may be specified to include directions along the high-resolution line and generally orientations that do not fall in the first two orientation classes. For example, the direction of interest of the movable units 7 could be associated to that third class.

The herein disclosed concepts may generally apply to situations in location systems, where a movement range of a movable unit is limited to an elongated access area (corresponding to the localizing space). Alternatively, an elongated access area for a movable device (corresponding to the localizing space) may be defined, e.g., by controlling the range of allowed movement of the movable device.

Although the preferred embodiments of this invention have been described herein, improvements and modifications may be incorporated without departing from the scope of the following claims.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A location system based on an ultra-wideband signal exchange, the location system comprising:
    a plurality of transmission reception circuits, wherein a first transmission reception circuit is configured to operate as a stationary unit of the location system for localizing tag devices by exchanging ultra-wideband signals, the tag devices being localizable within a localizing space that extends along a high-resolution line associated with the first transmission reception circuit;
    a movable unit;
    a first tag device and a second tag device that are positioned at the movable unit, wherein the first tag device and the second tag device share common circuit board electronics and each have a respective antenna, the positions of respective antennas defining the positions of the respective tags, wherein the antenna of the first tag device and the antenna of the second tag device are separated from each other by a tag separation distance; and
    a control circuit configured to perform an ultra-wideband signal analysis to determine, for a selected tag device within the localizing space, the distance from the selected tag device to the first transmission reception circuit and to derive an orientation of the movable unit with respect to the high-resolution line from distances determined for the first tag device and the second tag device.

2. The location system of claim 1, wherein
    the control circuit is configured to determine, for a selected tag device in the localizing space, the distance from the selected tag device to the first transmission reception circuit with an uncertainty of the distance given by a distance resolution of the ultra-wideband signal analysis, and
    the tag separation distance is at least as large as the distance resolution of the location system.

3. The location system of claim 2, wherein the tag separation distance is at least three times the distance resolution of the location system.

4. The location system of claim 2, wherein the tag separation distance is at most 50 times the distance resolution of the location system.

5. The location system of claim 1, wherein the control circuit is configured to derive the orientation of the movable unit with respect to the high-resolution line by identifying a sequence of the first tag device and the second tag device along the high-resolution line when projecting the determined distances onto the high-resolution line.

6. The location system of claim 1, wherein the movable unit is associated with a direction of interest that extends under a predefined angle to a tag-connection line extending between the tag devices, the control circuit being further configured to derive the orientation as an orientation of the direction of interest with respect to the high-resolution line.

7. The location system of claim 1, further comprising a second transmission reception circuit;
    wherein the localizing space extends between the first transmission reception circuit and the second transmission reception circuit along the high-resolution line;
    wherein the control circuit is configured to derive, for a selected tag device in the localizing space and from determined distances of the selected tag device to the first transmission reception circuit and the second transmission reception circuit, a range of positions within the localizing space having a high-resolution extent in a direction along the high-resolution line and a low-resolution extent in a direction orthogonal to the high-resolution line, wherein the high-resolution extent is smaller than the low-resolution extent; and
    wherein the tag separation distance is larger than the high-resolution extent.

8. The location system of claim 7, wherein the localizing space is an elongated localizing space extending between the first transmission reception circuit and the second transmission reception circuit and having a first end at the first transmission reception circuit, a second end at the second transmission reception circuit, and a center centrally between the first end and the second end; and
    wherein the first transmission reception circuit, the center of the elongated localizing space, and the second transmission reception circuit are aligned to an extent that the center of the elongated localizing space is shifted with respect to the high-resolution line by less than three times a width of the elongated localizing space.

9. The location system of claim 1, wherein the movable unit comprises a manned vehicle, an unmanned vehicle, or a unit carried by a human being.

10. The location system of claim 1, wherein the localizing space is an elongated localizing space extending along the high-resolution line and/or delimited by structures and forming an access space accessible for the movable unit.

11. The location system of claim 10, wherein the transmission reception circuit device are positioned at opposite ends of the elongated localizing space.

12. The location system of claim 10, wherein the localizing space has a length in a direction of the high-resolution line and a width orthogonal to the high-resolution line and the length is at least three times the width.

13. The location system of claim 12, wherein the length is at least 20 m.

14. The location system of claim 1, wherein at least one of the plurality of the transmission reception circuits and/or the tag devices includes a circuit board electronics with a radio pulse wave generator and receiver configured to perform ultra-wideband radio transmission and reception for large bandwidth communication with a bandwidth of at least 500 MHz or of at least 20% of a carrier frequency.

15. The location system of claim 14, wherein the radio pulse wave generator and receiver are configured to perform ultra-wideband radio transmission and reception for large bandwidth communication with a bandwidth of 3.1 GHz to 10.6 GHz.

16. The location system of claim 14, wherein the radio pulse wave generator and receiver are configured to perform ultra-wideband radio transmission and reception with an equivalent isotropically radiated power density of less than or equal to 41.3 dBm/MHz.

17. The location system of claim 1, wherein the control circuit is further configured to derive the orientation of the movable unit with respect to the high-resolution line from the distances determined for the antenna of the first tag device and for the antenna of the second tag device.

18. A storage system comprising:
a plurality of linearly extending rows of shelves arranged in a storage hall;
an access space between two of the rows of shelves for allowing access to storage areas of the shelves at each side of the access space; and
a location system comprising:
a plurality of transmission reception circuits, wherein a first transmission reception circuit is configured to operate as a stationary unit of the location system for localizing tag devices by exchanging ultra-wideband signals, the tag devices being localizable within a localizing space that extends along a high-resolution line associated with the first transmission reception circuit, the localizing space associated with the access space;
a movable unit;
a first tag device and a second tag device that are positioned at the movable unit and are separated from each other by a tag separation distance, wherein the tag separation distance is at least three times a distance resolution of the location system or at most 50 times the distance resolution of the location system; and
a control circuit configured to perform an ultra-wideband signal analysis to determine, for a selected tag device within the localizing space, the distance from the selected tag device to the first transmission reception circuit and to derive an orientation of the movable unit with respect to the high-resolution line from distances determined for the first tag device and the second tag device.

19. The storage system of claim 18, wherein a localizing space of the location system essentially overlaps with the access space, the localizing space being elongated along a high-resolution line of the location system and extending between the first transmission reception circuit and a second transmission reception circuit of the location system, the first transmission reception circuit and the second transmission reception circuit being positioned at opposite ends of the rows of shelves.

20. The storage system of claim 19, wherein the movable unit comprises a storing and/or picking device that is equipped with the first tag device and the second tag device of the location system, the first tag device and the second tag device being mounted at sides of the storing and/or picking device, wherein a direction of interest of the storing and/or picking device is related to a storing and/or picking activity performed with the storing and/or picking device.

21. The storage system of claim 18, wherein the control circuit is configured to analyze which shelf at which side of the access space was accessed using an analysis of an orientation of a direction of interest with respect to the high-resolution line.

22. The storage system of claim 18, wherein the movable unit is a forklift truck having a loading area and a loading direction for storing and/or picking parts as a direction of interest.

23. The storage system of claim 18, wherein the movable unit is integrated into an article of clothing having the first and second tag devices attached thereto.

24. A method for identifying an orientation of a movable unit within a localizing space of a location system that includes a first tag device and a second tag device attached to the movable unit at a tag separation distance, the location system also including a first transmission reception circuit configured to operate as a stationary unit of the location system for localizing tag devices by exchanging ultra-wideband signals, the tag devices being localizable within a localizing space that extends along a high-resolution line associated with the first transmission reception circuit, the method comprising:
determining the distances from each of the first tag device and the second tag device to the first transmission reception circuit; and
deriving from the distances determined for the first tag device and the second tag device the orientation of the movable unit with respect to the high-resolution line, wherein deriving the orientation comprises:
projecting the determined distances onto the high-resolution line,
identifying a sequence of the first tag device and the second tag device along the high-resolution line, and
associating the identified sequence with orientation classes that include two orientation classes specified as two directions that are orthogonal to the high-resolution line and pointing in opposite directions.

25. The method of claim 24, wherein the distances from the tag devices to the first transmission reception circuit are determined with an uncertainty of the distance given by a distance resolution of ultra-wideband signal analysis, the uncertainty being less than or equal to the tag separation distance.

26. The method of claim 24, wherein deriving the orientation comprises deriving the orientation of the movable unit with respect to the high-resolution line based on the identified sequence.

27. The method of claim 24, wherein one of the two orientation classes is specified as a direction along the high-resolution line.

28. The method of claim 24, wherein the location system also includes a second transmission reception circuit and the localizing space extends between the first transmission reception circuit and the second transmission reception circuit along the high-resolution line, which connects the first transmission reception circuit and the second transmission reception circuit, the method further comprising:
determining distances from each of the first tag device and the second tag device to the second transmission reception circuit; and
deriving from the determined distances a range of positions within the localizing space having a high-resolution extent in a direction along the high-resolution line and a low-resolution extent in a direction orthogonal to the high-resolution line, wherein the high-resolution extent is smaller than the low-resolution extent, wherein the tag separation distance is larger than the high-resolution extent.

29. The method of claim 24, further comprising:
associating a direction of interest to the movable unit, the direction of interest extending under a predetermined angle with respect to a tag-connection line between the first tag device and the second tag device; and deriving the orientation as an orientation of the direction of interest with respect to the high-resolution line.

30. The method of claim 29, wherein the predetermined angle is an angle in the range between 50° and 130° with respect to the tag-connection line resulting in the direction of interest and the tag-connection line running orthogonal to each other.

31. The method of claim 24, further comprising limiting a movement range of the movable unit to an elongated access area corresponding to the localizing space.

32. The method of claim 24, further comprising associating the distance measured for one of the tag devices or an averaged mean distance of the tag devices to a position of the one of the tag devices within the localizing space along the high-resolution line.

33. The method of claim 24, wherein the tag devices are integrated into an article of clothing and the movable unit comprises a person wearing the article of clothing.

34. The method of claim 24, wherein the tag separation distance is at least three times a distance resolution of the location system or at most 50 times the distance resolution of the location system.

* * * * *